United States Patent [19]

Morota et al.

[11] Patent Number: 5,080,395
[45] Date of Patent: Jan. 14, 1992

[54] OCCUPANT PROTECTIVE SYSTEM FOR AUTOMOTIVE VEHICLES

[75] Inventors: Makie Morota; Koichi Kamiji, both of Wako, Japan

[73] Assignee: Honda Giken Kogyo Kabushiki Kaisha, Tokyo, Japan

[21] Appl. No.: 580,440

[22] Filed: Sep. 10, 1990

[30] Foreign Application Priority Data

Sep. 12, 1989 [JP] Japan ............................ 1-107132[U]

[51] Int. Cl.$^5$ ............................................ B60R 21/32
[52] U.S. Cl. .................................. 280/735; 307/101; 340/436
[58] Field of Search .............. 280/735, 734; 340/436, 340/438; 307/10.1

[56] References Cited

U.S. PATENT DOCUMENTS

| | | | |
|---|---|---|---|
| 3,668,627 | 6/1972 | Brainerd | 280/735 |
| 3,863,208 | 1/1975 | Balban | 280/735 |
| 4,220,871 | 9/1980 | Yasui et al. | 307/10.1 |
| 4,974,874 | 12/1990 | Muraoka | 280/735 |
| 4,987,316 | 1/1991 | White et al. | 340/436 |

FOREIGN PATENT DOCUMENTS 2225906  6/1990  United Kingdom ............... 280/734

*Primary Examiner*—Kenneth R. Rice
*Attorney, Agent, or Firm*—Armstrong, Nikaido, Marmelstein, Kubovcik & Murray

[57] ABSTRACT

An improved occupant protective system for an automotive vehicle includes an occupant-protecting member, an acceleration sensor for detecting acceleration of the vehicle, an actuator for actuating the occupant-protecting member, and a monitoring device for monitoring potentials of two signal lines connected respectively to the opposite ends of the actuator and having portions thereof extending substantially parallel with each other. One of the signal lines is connected between the acceleration sensor and the actuator. When the vehicle undergoes acceleration having a magnitude greater than a predetermined value, the acceleration sensor operates to cause an increased amount of electric current to flow through the two signal lines to thereby cause the actuator to operate. The improved occupant protective system includes a monitoring line extending parallel with the two signal lines along the portions of the two signal lines extending substantially parallel with each other. The monitoring line has one end thereof being open. A voltage, which is different from the potentials of the two signal lines when the vehicle is normally running, is applied to another end of the monitoring line.

11 Claims, 2 Drawing Sheets

OCCUPANT PROTECTIVE SYSTEM FOR AUTOMOTIVE VEHICLES

BACKGROUND OF THE INVENTION

This invention relates to an occupant protective system for automotive vehicles, and more particularly to an occupant protective system of the kind which protects occupants by inflating an air bag when the automotive vehicle is involved in a crash.

Conventionally, there has already been proposed an air bag system for automotive vehicles, as shown in FIG. 1. The air bag system comprises a control unit 100 including an acceleration sensor 101 for sensing a shock resulting from a crash of the vehicle, and a gas generator 103 including a squib 102 which is energized upon a crash of the vehicle for igniting the gas generator 103 to cause the same to generate a gas for inflating an air bag, not shown. The acceleration sensor 101 of the control unit 100 and the squib 102 of the gas generator 103 are electrically connected together via two signal lines 105 and 106. The gas generator 103 is mounted together with the air bag on a steering wheel, not shown, which rotates. According to this air bag system, in order to electrically connect portions of the signal lines 105 and 106 on the side of the squib 102 of the gas generator 103 mounted on the steering wheel, to portions of the signal lines 105 and 106 on the side of the control unit 100, which does not rotate, a cable reel 107 in which a harness of portions of the signal lines 105 and 106 is coiled is mounted on the steering wheel.

However, since the two signal lines 105 and 106 are arranged such that they extend substantially parallel and close to each other within the harness, a short circuit can be formed, though very rarely, between a point of the signal line 105 within the harness and a point of the signal line 106 within the harness or between other points of these signal lines due to manufacturing errors etc., which renders the air bag system inoperative. In the meanwhile, in the above prior art, the resistance $R_2$ of the squib 102, which is connected in series with a monitoring resistance $R_1$ of the acceleration sensor 101, is much smaller than the resistance $R_1$. Therefore, when a short circuit occurs between the signal lines 105 and 106 connected to the squib 102, it is difficult to detect the short circuit.

SUMMARY OF THE INVENTION

It is an object of the invention to provide an occupant protective system for automotive vehicles, which is capable of positively detecting a short circuit occurring between signal lines connected to a squib.

A further object of the invention is to enable the occupant protective system to continue its operation even when such a short circuit occurs.

To attain the above objects, the present invention provides an occupant protective system for an automotive vehicle, including an occupant-protecting member, an acceleration sensor for detecting acceleration of the vehicle, an actuator for actuating the occupant-protecting member, the actuator having opposite ends, two signal lines connected respectively to the opposite ends of the actuator and having portions thereof extending substantially parallel with each other, one of the signal lines connecting between the acceleration sensor and the actuator, and a monitoring device for monitoring potentials of the two signal lines, and wherein when the vehicle undergoes acceleration having a magnitude greater than a predetermined value, the acceleration sensor operates to cause an increased amount of electric current to flow through the two signal lines to thereby cause the actuator to operate.

The occupant protective system according to the invention is characterized by comprising a monitoring line extending parallel with the two signal lines along the portions of the two signal lines extending substantially parallel with each other, the monitoring line having one end thereof being open, and a device for applying a voltage, which is different from the potentials of the two signal lines assumed when the vehicle is normally running, to another end of the monitoring line.

In an embodiment of the invention, the actuator comprises a squib actuatable when electric current flowing through the two signal lines increases, and a gas-generating device disposed to be ignited by the squib for generating a gas for actuating the occupant-protecting member.

Preferably, a resistance having a resistance value which is much greater than the value of the internal resistance of the actuater is inserted into the monitoring line at an intermediate portion thereof.

The above and other objects, features, and advantages of the invention will become more apparent from the ensuing detailed description taken in conjunction with the accompanying drawings.

DETAILED DESCRIPTION

An occupant protective system according to an embodiment of the invention will now be described in detail.

Figure 1:
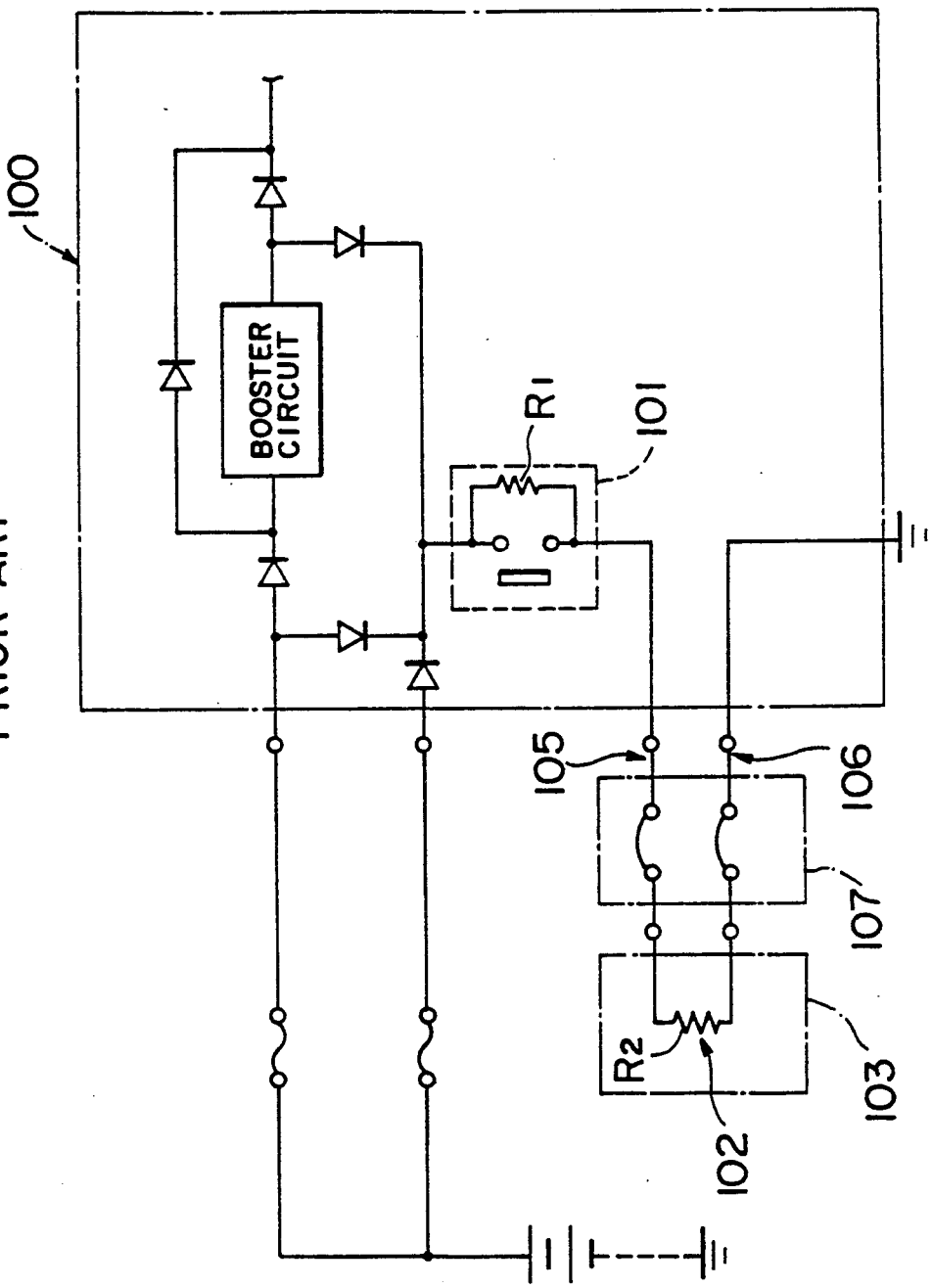
FIG. 1 is a circuit diagram schematically showing a conventional occupant protective system for an automotive vehicle.
Figure 2:
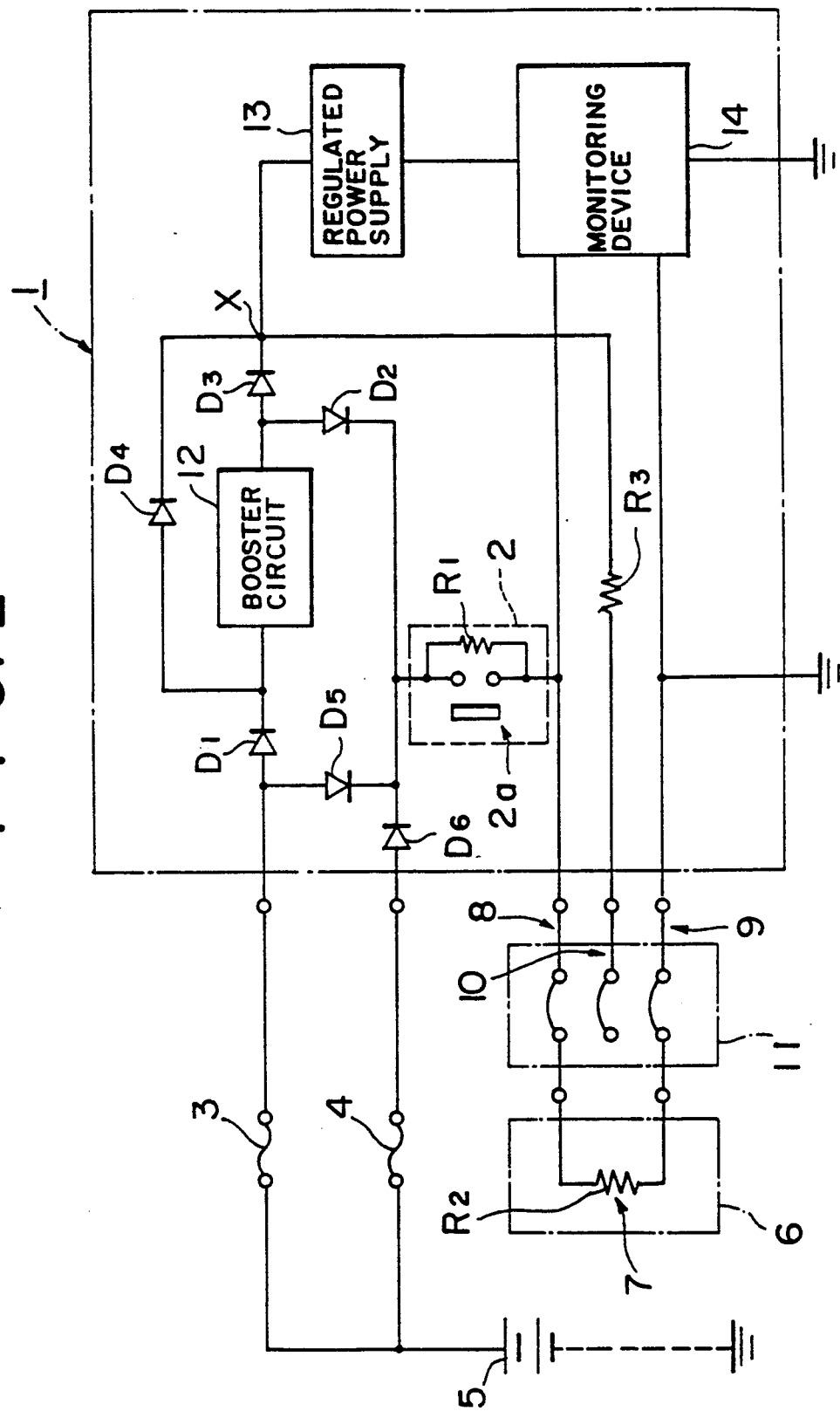
FIG. 2 is a circuit diagram schematically showing an occupant protective system for an automotive vehicle according to an embodiment of the invention.

FIG. 2 schematically shows an occupant protective system for an automotive vehicle according to an embodiment of the invention. In the figure, reference numeral 1 indicates a control unit including an acceleration sensor 2 for detecting a shock (acceleration) resulting from a crash of the vehicle. A power source 5 is connected to the control unit 1 by way of fuses 3 and 4, and a squib 7 of a gas generator 6 is also connected thereto via two signal lines 8 and 9. Between the two signal lines 8, 9, there is arranged one monitoring line 10 extending parallel with the signal lines 8, 9 over substantially the entire length of portions of the two signal lines extending substantially parallel with each other.

The gas generator 6 is mounted on a steering wheel, not shown, of the vehicle, together with an air bag (occupant-protecting member), not shown. In order to connect portions of the signal lines 8 and 9 of the squib 7 of the gas generator 6 mounted on the steering wheel, which rotates, to portions of the signal lines 8 and 9 of the control unit 1 which is fixedly arranged in the compartment, a cable reel 11 in which a harness of portions of the signal lines 8 and 9 and the monitoring line 10 is coiled is mounted on the steering wheel.

In the control unit 1, a booster circuit 12 is provided, which operates to constantly secure a predetermined voltage (e.g. 12 V) even if the output voltage (e.g. 12 V) of the power source 5 is changed. The predetermined voltage is set at a value high enough to cause a sufficient amount of current to flow through the squib 7 upon a crash of the vehicle. The input side of the booster circuit 12 is connected to the fuse 3 by way of a diode $D_1$, and the output side of the same is connected to the input side of the acceleration sensor 2 and the input side of a regulated power supply 13 by way of diodes $D_2$ and $D_3$, respectively. A diode $D_4$ is connected between the input side of the booster circuit 12 and the output side of the diode $D_3$, whereby a junction X on the output side of the diode $D_3$ is maintained substantially at the predetermined voltage or the power source voltage. The input side of the acceleration sensor 2 is connected to the fuses 3 and 4 by way of diodes $D_5$ and $D_6$, respectively. Thus, electric current flows to the input side of the acceleration circuit 2 by way of any of the diodes $D_2$, $D_5$, and $D_6$.

The acceleration sensor 2 is composed of a monitoring resistance $R_1$, and a switch 2a which is connected in parallel to the resistance $R_1$ and becomes closed when it is given a shook resulting from a crash of the vehicle. The output side of the acceleration sensor 2 is connected to one end of the squib 7 via the signal line 8. The other end of the squib 7 is grounded via the signal line 9. The value of the resistance (internal resistance) $R_2$ of the squib 7 connected in series to the resistance $R_1$ of the acceleration sensor 2 is very small (e.g. 2 $\Omega$) as compared with that (e.g. 2 K$\Omega$) of the resistance $R_1$.

One end of the monitoring line 10 is connected to the junction X, and the other end of same the is open. Therefore, the potential at any point of the monitoring line 10 is equal to the potential of the junction X, i.e. substantially equal to the predetermined voltage or the power source voltage. Inserted into an intermediate part of the monitoring line 10 is a resistance $R_3$ which has a resistance value (e.g. 1.5 K$\Omega$) much greater than the value of the resistance $R_2$ of the squib 7.

The requlated power supply 13 has its output side connected to a monitoring device 14 and supplies a constant voltage (e.g. 5 V) thereto. The monitoring device 14 constantly monitors the potentials of the two signal lines 8 and 9. The monitoring device 14 may be constructed such that it actuates an alarm lamp to flicker or actuates a buzzer to give an alarm to notify the short-circuiting of the squib 7 when an abnormal change in the potential of either of the signal lines 8 and 9 is detected.

Next, the operation of the occupant protective system having the above-described construction will be described.

When the vehicle is in a normal running condition, the switch 2a of the acceleration sensor 2 is open, so that electric current flows through the monitoring resistance $R_1$ from any one of the diodes $D_2$, $D_5$, and $D_6$. Therefore, the amount of electric current flowing through the squib 7 connected in series with the resistance $R_1$ is so small that the gas generator 6 is kept inoperative.

Under such a normal running condition of the vehicle, even if the two signal lines 8 and 9 move toward each other at any location due to some cause, one of the signal lines becomes short-circuited to the monitoring line 10 before the two signal lines 8 and 9 are short-circuited to each other. Accordingly, the potential of the one of the signal lines 8 and 9, which assumed a value of about 6 V before the one of the signal lines 8 and 9 becomes short-circuited &o the monitoring line 10, rises to a value equal to the potential of the junction X to which the one end of the monitoring line 10 is connected, i.e. a potential substantially equal to the predetermined voltage (12 V) or the fluctuating power source voltage. The monitoring device 14 detects such a rise in the potential of the signal line 8 or 9, to make it possible to detect that one of the signal lines 8 and 9 connected to the respective ends of the squib 7 is short-circuited to the monitoring line 10. The monitoring device 14 then actuates the alarm lamp or the buzzer to motify the short-circuiting.

When the vehicle undergoes a shock resulting from a crash thereof while neither of the signal lines 8 and 9 is short-circuited to the monitoring line 10, the acceleration sensor 2 senses the shock to close the switch 2a. This causes a sufficiently large amount of driving current to flow through the squib 7 to ignite an ignition agent in the gas generator 6 whereby a nitrogen gas-generating agent burns to generate nitrogen gas to fill the air bag with nitrogen gas so that the air bag is inflated instantly. As a result, the air bag prevents the face of the occupant from being hit against the steering wheel or the windshield due to the shock resulting from the crash of the vehicle.

Further, even if a crash of the vehicle occurs while one of the signal lines B and 9 is short-circuited to the monitoring line 10, a sufficiently large amount of driving current still flows through the squib 7 from closure of switch 2a upon the crash of the vehicle to ensure instant inflation of the air bag, since the resistance $R_3$ which has a value much larger than the value of the resistance $R_2$ of the squib 7 is provided in the intermediate part of the monitoring line 10.

Further, if the output voltage from the booster circuit 12 is abnormally lowered due to a short circuit formed between one of the signal lines 8, 9 and the monitoring line or between other parts, a voltage substantially equal to the output voltage from the power source 5 is supplied through the diode $D_4$ to the monitoring line 10 as well as to the regulated power supply 13, which enables positive detection of the short circuit.

In addition, the present invention is not limited to the above-described embodiment of the occupant protective system for an automotive vehicle according to the present invention, but may be applied to other types or kinds of occupant protective systems having squibs each having two signal lines connected thereto.

What is claimed is:

1. An occupant protective system for an automotive vehicle, comprising:

an occupant-protecting member;

an acceleration sensor for detecting acceleration of said vehicle;

an actuator for actuating said occupant-protecting member, said actuator having opposite ends;

two signal lines connected respectively to the opposite ends of said actuator and having portions thereof extending substantially parallel with each other, one of said signal lines connecting between said acceleration sensor and said actuator;

monitoring means connected between said two signal lines for monitoring potentials of said two signal lines, wherein when said vehicle undergoes acceleration having a magnitude greater than a predetermined value, said acceleration sensor operates to cause an increased amount of electric current to flow through said two signals lines to cause said actuator to operate;

a monitoring line extending parallel with said two signal lines and between said portions of said two signal lines extending substantially parallel with each other, said monitoring line having one end thereof being open; and means for applying a voltage, which is different from the potentials of said two signal lines when said vehicle is normally running, to another end of said monitoring line.

2. An occupant protective system for an automotive vehicle according to claim 1, wherein said actuator comprises a squib actuatable when electric current flowing through said two signal lines increases, and gas-generating means disposed to be ignited by said squib for generating a gas for actuating said occupant-protecting member.

3. An occupant protective system for an automotive vehicle according to claim 1 or 2, wherein said actuator has an internal resistance, and wherein a resistance having a resistance value which is much greater than a value of said internal resistance is inserted into said monitoring line at an intermediate portion thereof.

4. An occupant protective system for an automotive vehicle according to claim 1 or 2, including a power source, and wherein said acceleration sensor comprises a switch connected between said power source and said one of said signal lines for being closed in response to said acceleration of said vehicle having a value higher than said predetermined value for connecting said power source with said one of said signal lines.

5. An occupant protective system for an automotive vehicle according to claim 4, wherein said actuator has an internal resistance, and wherein a resistance having a value much greater than a value of said internal resistance is connected in parallel with said switch of said acceleration sensor.

6. An occupant protective system for an automotive vehicle according to claim 5, wherein said monitoring means monitors a potential at a junction of said resistance with said one of said signal lines.

7. An occupant protective system for an automotive vehicle according to claim 6, including a power source, and booster means connected to said power source for regulating an output voltage therefrom to a predetermined value, and wherein said means for applying said voltage to said another end of said monitoring line is formed by said booster means.

8. An occupant protective system for an automotive vehicle according to claim 7, including a diode connected in parallel with said booster means for by-passing said booster means to supply a voltage which is substantially equal to said output voltage from said power source, and wherein said means for applying said voltage to said another end of said monitoring line is formed by said diode.

9. An occupant protective system for an automotive vehicle according to claim 8, including a regulated power supply for supplying a regulated voltage to said monitoring means, and wherein said regulated power supply is connected to said booster means and said diode for regulating said predetermined voltage from said booster means or said voltage from said diode which is substantially equal to said output voltage from said power source to said regulated voltage.

10. An occupant protective system for an automotive vehicle according to claim 1 wherein said actuator is mounted on a steering wheel and a first portion of said two signal lines are mounted on said steering wheel and a second portion of said two signal lines are fixedly mounted on said automotive vehicle and further comprising a connecting means for connecting said first and second portions together.

11. An occupant protective system for an automotive vehicle according to claim 10 wherein said connecting means is a cable reel in which a harness of said portions of said signal lines and said open end of said monitoring line are coiled.

* * * * *